(12) United States Patent
Daga (10) Patent No.: US 8,869,020 B2
(45) Date of Patent: Oct. 21, 2014

(54) METHOD AND SYSTEM FOR GENERATING RELATIONAL SPREADSHEETS

(75) Inventor: Rakshit Daga, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1141 days.

(21) Appl. No.: 11/646,175

(22) Filed: Dec. 27, 2006

(65) Prior Publication Data

US 2008/0162532 A1    Jul. 3, 2008

(51) Int. Cl.
*G06F 17/00* (2006.01)
*G06F 17/30* (2006.01)

(52) U.S. Cl.
CPC ............................ *G06F 17/30554* (2013.01)
USPC ..................................................... 715/212

(58) Field of Classification Search
USPC ........................................................ 715/212
See application file for complete search history.

(56) References Cited

U.S. PATENT DOCUMENTS

| | | | |
|---|---|---|---|
| 5,293,615 A * | 3/1994 | Amada | 707/4 |
| 5,499,371 A | 3/1996 | Henninger et al. | |
| 5,752,253 A * | 5/1998 | Geymond et al. | 715/209 |
| 5,799,309 A | 8/1998 | Srinivasan | |
| 5,819,282 A | 10/1998 | Hooper et al. | |
| 5,838,965 A | 11/1998 | Kavanagh et al. | |
| 5,893,125 A * | 4/1999 | Shostak | 715/206 |
| 6,047,284 A | 4/2000 | Owens et al. | |
| 6,317,750 B1 * | 11/2001 | Tortolani et al. | 707/103 R |
| 6,507,846 B1 | 1/2003 | Consens | |
| 6,741,998 B2 * | 5/2004 | Ruth et al. | 707/797 |
| 6,775,675 B1 * | 8/2004 | Nwabueze et al. | 707/600 |
| 6,839,719 B2 * | 1/2005 | Wallace | 707/104.1 |
| 7,026,502 B2 | 4/2006 | Benderly et al. | |
| 7,062,502 B1 * | 6/2006 | Kesler | 707/102 |
| 7,328,215 B2 * | 2/2008 | Stumpf | 707/797 |
| 7,529,727 B2 * | 5/2009 | Arning et al. | 707/2 |
| 8,015,210 B2 | 9/2011 | Daga | |
| 8,046,677 B2 * | 10/2011 | Eischeid | 715/212 |
| 2002/0111932 A1 * | 8/2002 | Roberge et al. | 707/1 |
| 2003/0028545 A1 | 2/2003 | Wang et al. | |
| 2003/0115207 A1 * | 6/2003 | Bowman et al. | 707/100 |
| 2003/0180718 A1 * | 9/2003 | Pillutla et al. | 435/5 |
| 2003/0204511 A1 * | 10/2003 | Brundage et al. | 707/100 |
| 2004/0064458 A1 | 4/2004 | Hagarty | |
| 2004/0139116 A1 | 7/2004 | Porter | |
| 2004/0181543 A1 | 9/2004 | Wu et al. | |
| 2006/0101324 A1 * | 5/2006 | Goldberg et al. | 715/503 |
| 2006/0107196 A1 * | 5/2006 | Thanu et al. | 715/503 |

(Continued)

OTHER PUBLICATIONS

Snell, "Using Excel To Prototype Relational Database Applications", May 2004, p. 1-7, URL<http://www.soa.org/library/newsletters/compact/2004/may/com-2004-iss17-snell-02.pdf>.*

(Continued)

*Primary Examiner* — Adam M Queler
*Assistant Examiner* — Mustafa Amin
(74) *Attorney, Agent, or Firm* — Brake Hughes Bellermann LLP (57) ABSTRACT

A method and system are described that may generate and process relational spreadsheets, for example, for database entities such as objects. An example method may include generating a relational spreadsheet page including relational spreadsheet entries indicating one or more hierarchical relationships among a plurality of database entities associated with a database based on a relational graph indicating relational relationships among the database entities and based on information associated with a plurality of objects. The method may include displaying the relational spreadsheet page.

21 Claims, 6 Drawing Sheets

(56) References Cited

U.S. PATENT DOCUMENTS

| | | | |
|---|---|---|---|
| 2006/0235838 A1* | 10/2006 | Shan et al. | 707/4 |
| 2006/0259509 A1* | 11/2006 | Stolte et al. | 707/102 |
| 2007/0050697 A1* | 3/2007 | Lewis-Bowen et al. | 715/503 |
| 2007/0130511 A1* | 6/2007 | Roberge et al. | 715/517 |
| 2007/0274154 A1* | 11/2007 | Simon et al. | 367/38 |
| 2008/0016041 A1* | 1/2008 | Frost et al. | 707/3 |
| 2008/0162553 A1 | 7/2008 | Daga | |
| 2009/0031230 A1* | 1/2009 | Kesler | 715/764 |
| 2011/0106795 A1* | 5/2011 | Maim | 707/728 |

OTHER PUBLICATIONS

Non-Final Office Action for U.S. Appl. No. 11/646,173, mailed on Feb. 15, 2011, 26 pages.

Office Action for U.S. Appl. No. 11/646,173, mailed on Dec. 9, 2009, 21 pages.

Office Action Response for U.S. Appl. No. 11/646,173, filed on Jun. 14, 2011, 19 pages.

Notice of Allowance for U.S. Appl. No. 11/646,173, mailed on Jul. 19, 2011, 9 pages.

Amendment Under 37 CFR 1.312 for U.S. Appl. No. 11/646,173, filed Jul. 27, 2011, 13 pages.

Office Action for U.S. Appl. No. 11/646,173, mailed on Mar. 23, 2009, 18 pages.

Office Action for U.S. Appl. No. 11/646,173, mailed on Jul. 22, 2009, 17 pages.

Advisory Action for U.S. Appl. No. 11/646,173, mailed on Sep. 25, 2009, 3 pages.

Office Action for U.S. Appl. No. 11/646,173, mailed Apr. 28, 2010, 26 pages.

\* cited by examiner

| | | | | | | | | |
|---|---|---|---|---|---|---|---|---|
| | | | | RAKSHIT DAGA 0 | RAKSHIT DAGA 0 | RAKSHIT DAGA 0 | RAKSHIT DAGA 0 | RAKSHIT DAGA 0 |
| ☐ | | | | EXPANDED VALUE 0 | EXPANDED VALUE 0 | EXPANDED VALUE 0 | EXPANDED VALUE 0 | EXPANDED VALUE 0 |
| | ☐ | | | EXPANDED VALUE 1 | EXPANDED VALUE 1 | EXPANDED VALUE 1 | EXPANDED VALUE 1 | EXPANDED VALUE 1 |
| | | ⊞ | | EXPANDED VALUE 2 | EXPANDED VALUE 2 | EXPANDED VALUE 2 | EXPANDED VALUE 2 | EXPANDED VALUE 2 |
| | | ⊟ | | EXPANDED VALUE 3 | EXPANDED VALUE 3 | EXPANDED VALUE 3 | EXPANDED VALUE 3 | EXPANDED VALUE 3 |
| | | ⊟ | | EXPANDED VALUE 0 | EXPANDED VALUE 0 | EXPANDED VALUE 0 | EXPANDED VALUE 0 | EXPANDED VALUE 0 |
| | | | ⊞ | EXPANDED VALUE 1 | EXPANDED VALUE 1 | EXPANDED VALUE 1 | EXPANDED VALUE 1 | EXPANDED VALUE 1 |
| | | | ⊟ | EXPANDED VALUE 2 | EXPANDED VALUE 2 | EXPANDED VALUE 2 | EXPANDED VALUE 2 | EXPANDED VALUE 2 |
| | | | | EXPANDED VALUE 0 | EXPANDED VALUE 0 | EXPANDED VALUE 0 | EXPANDED VALUE 0 | EXPANDED VALUE 0 |
| | | | | EXPANDED VALUE 1 | EXPANDED VALUE 1 | EXPANDED VALUE 1 | EXPANDED VALUE 1 | EXPANDED VALUE 1 |
| | | | | EXPANDED VALUE 2 | EXPANDED VALUE 2 | EXPANDED VALUE 2 | EXPANDED VALUE 2 | EXPANDED VALUE 2 |
| | | | | EXPANDED VALUE 3 | EXPANDED VALUE 3 | EXPANDED VALUE 3 | EXPANDED VALUE 3 | EXPANDED VALUE 3 |
| | | | | EXPANDED VALUE 4 | EXPANDED VALUE 4 | EXPANDED VALUE 4 | EXPANDED VALUE 4 | EXPANDED VALUE 4 |
| | | | ⊞ | EXPANDED VALUE 3 | EXPANDED VALUE 3 | EXPANDED VALUE 3 | EXPANDED VALUE 3 | EXPANDED VALUE 3 |
| | | | | EXPANDED VALUE 4 | EXPANDED VALUE 4 | EXPANDED VALUE 4 | EXPANDED VALUE 4 | EXPANDED VALUE 4 |
| | | | | EXPANDED VALUE 1 | EXPANDED VALUE 1 | EXPANDED VALUE 1 | EXPANDED VALUE 1 | EXPANDED VALUE 1 |
| | ⊞ | | | EXPANDED VALUE 2 | EXPANDED VALUE 2 | EXPANDED VALUE 2 | EXPANDED VALUE 2 | EXPANDED VALUE 2 |
| | ⊟ | | | EXPANDED VALUE 3 | EXPANDED VALUE 3 | EXPANDED VALUE 3 | EXPANDED VALUE 3 | EXPANDED VALUE 3 |
| | ⊟ | | | EXPANDED VALUE 4 | EXPANDED VALUE 4 | EXPANDED VALUE 4 | EXPANDED VALUE 4 | EXPANDED VALUE 4 |
| | | | | RAKSHITGA 1 | RAKSHITGA 1 | RAKSHITGA 1 | RAKSHITGA 1 | RAKSHITGA 1 |
| ⊞ | | | | RAKSHIT DAGA 2 | RAKSHIT DAGA 2 | RAKSHIT DAGA 2 | RAKSHIT DAGA 2 | RAKSHIT DAGA 2 |
| ⊟ | | | | EXPANDED VALUE 0 | EXPANDED VALUE 0 | EXPANDED VALUE 0 | EXPANDED VALUE 0 | EXPANDED VALUE 0 |
| | ⊞ | | | EXPANDED VALUE 1 | EXPANDED VALUE 1 | EXPANDED VALUE 1 | EXPANDED VALUE 1 | EXPANDED VALUE 1 |
| | ⊟ | | | EXPANDED VALUE 2 | EXPANDED VALUE 2 | EXPANDED VALUE 2 | EXPANDED VALUE 2 | EXPANDED VALUE 2 |
| | ⊟ | | | EXPANDED VALUE 3 | EXPANDED VALUE 3 | EXPANDED VALUE 3 | EXPANDED VALUE 3 | EXPANDED VALUE 3 |
| | | | | EXPANDED VALUE 4 | EXPANDED VALUE 4 | EXPANDED VALUE 4 | EXPANDED VALUE 4 | EXPANDED VALUE 4 |
| ⊞ | | | | RAKSHIT DAGA 3 | RAKSHIT DAGA 3 | RAKSHIT DAGA 3 | RAKSHIT DAGA 3 | RAKSHIT DAGA 3 |
| ⊟ | | | | RAKSHIT DAGA 4 | RAKSHIT DAGA 4 | RAKSHIT DAGA 4 | RAKSHIT DAGA 4 | RAKSHIT DAGA 4 |

FIG. 6

METHOD AND SYSTEM FOR GENERATING RELATIONAL SPREADSHEETS

TECHNICAL FIELD

This description relates to information storage and retrieval techniques.

BACKGROUND

Storing and retrieving information quickly and efficiently has conventionally been a challenge, for example, with respect to business tasks in companies. Further, user interaction with databases has conventionally been somewhat restrictive, as many users rely on database applications to interact with relational databases to store and retrieve information associated with objects included in the relational database. However, many users easily interact with conventional spreadsheets, as working with the two-dimensional view provided by rows and columns may enable the user to more easily access the data contained in the spreadsheet cells to manipulate the values, for example, by easily editing/updating the individual cell values. Further, users may easily add/delete rows and/or columns of conventional spreadsheets via simple interactive actions such as mouse movements, mouse clicks, and text entry. However, conventional spreadsheets may not provide convenient user access, for example, to relational database data.

With regard to conventional relational databases, records or database objects may be stored in tables based on a unique identifier for each record or object. Database entities may be related to each other via various relationships which may be reflected, for example, via columns having common names. For example, a "person" object may include a particular set of "person" attributes, and the "person" may include an "is-a" relationship with a "manager" entity. The "manager" may have a "manager-of" relationship with another "person" object. Thus, there may exist an object hierarchy such that a meaningful response to a query may require a navigation of an object tree which may involve retrieving objects at each node of the navigation, which may be very time-consuming.

For example, when a user submits a query to a relational database system, the database system may process the query by performing various operations on the tables in the database. The user, for example, may interact with an application that provides a display of the requests to queries as they are received from a database manager after processing.

A typical example user may prefer to view two-dimensional views of data as provided by conventional spreadsheets. However, conventional spreadsheets store the data in spreadsheet files that may be accessible only via activation of the spreadsheet application. Similarly, a user, for example, of a relational database may prefer a more user-friendly interaction with the relational database. Thus, it may be desirable to provide storage and retrieval techniques which improve a user's interactive experiences with spreadsheets and with databases.

SUMMARY

According to one general aspect, a method includes generating a relational spreadsheet page including relational spreadsheet entries indicating one or more hierarchical relationships among a plurality of database entities associated with a database based on a relational graph indicating relational relationships among the database entities and based on information associated with a plurality of objects. The method further includes displaying the relational spreadsheet page.

According to yet another aspect, a system includes a relational spreadsheet generator configured to generate a relational spreadsheet page including relational spreadsheet entries indicating one or more hierarchical relationships among a plurality of database entities associated with a database based on a relational graph indicating relational relationships among the database entities and based on information associated with a plurality of objects. The system further includes a relational spreadsheet manager configured to display the relational spreadsheet page.

According to yet another aspect, a computer program product is tangibly embodied on a computer-readable medium and is configured to cause a data processing apparatus to generate a relational spreadsheet page including relational spreadsheet entries indicating one or more hierarchical relationships among a plurality of database entities associated with a database based on a relational graph indicating relational relationships among the database entities and based on information associated with a plurality of objects and display the relational spreadsheet page.

The details of one or more implementations are set forth in the accompanying drawings and the description below. Other features will be apparent from the description and drawings, and from the claims.

BRIEF DESCRIPTION OF THE DRAWINGS

FIG. 6 is a block diagram that depicts an example relational spreadsheet page according to an example embodiment.

DETAILED DESCRIPTION

Figure 1:
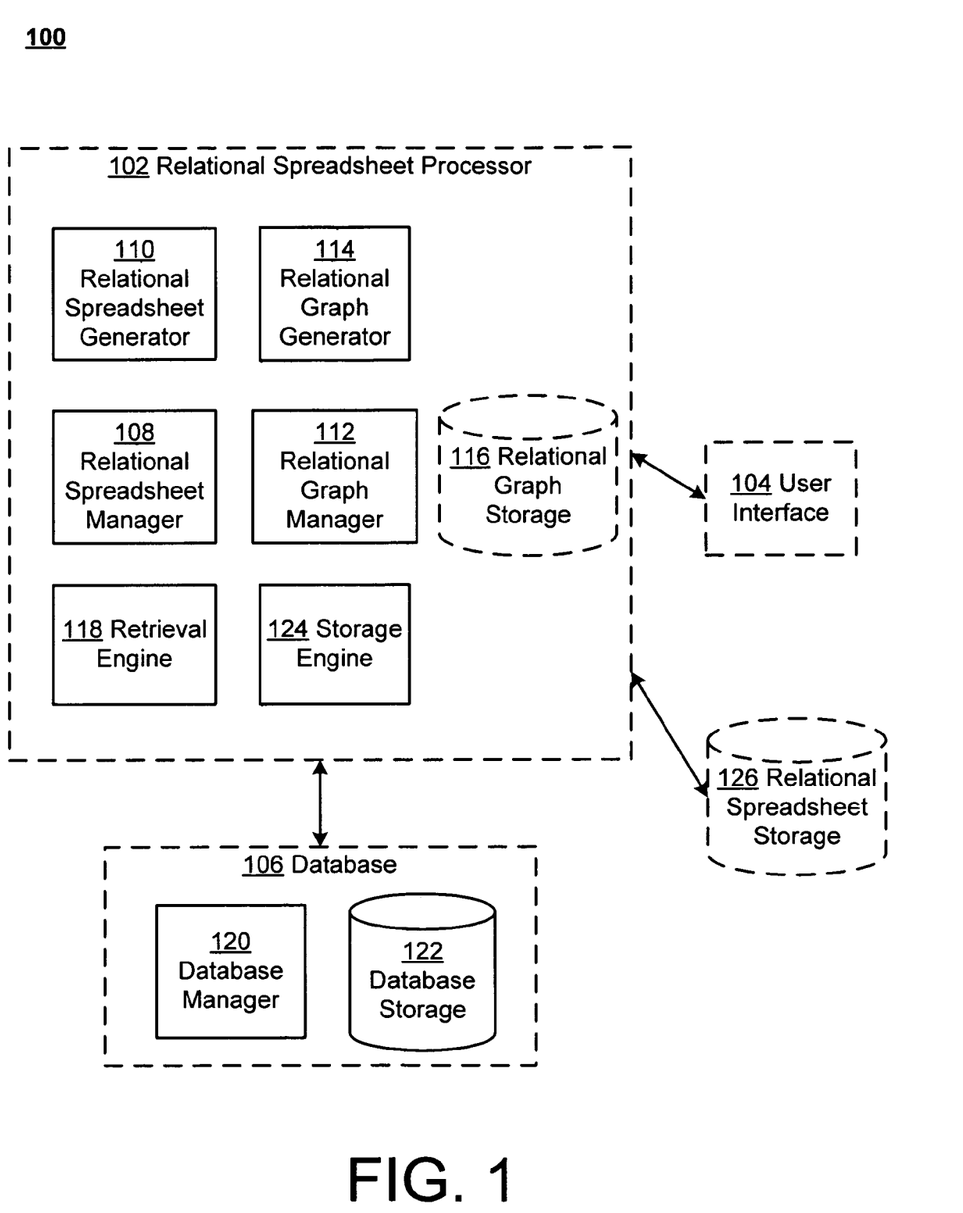
FIG. 1 is a block diagram of an example system for generating relational spreadsheets.

FIG. 1 is a block diagram of a system 100 for generating and processing relational spreadsheets. In the example of FIG. 1, relational spreadsheet processor 102 includes various processing engines that provide and process relational spreadsheets that may be displayed and edited, for example, by users via a user interface 104 requesting information associated with objects, for example, objects associated with databases. For example, the user may view, edit, and request via a relational spreadsheet, information associated with entities or objects associated with a database 106.

The relational spreadsheet processor 102 may include a relational spreadsheet manager 108 that may be configured to control generation and display of relational spreadsheets, for example, for a user via the user interface 104. For example, if a user requests a particular relational spreadsheet page via the user interface 104, the relational spreadsheet manager 108 may send a request to a relational spreadsheet generator 110 included in the relational spreadsheet processor 102 to generate the requested relational spreadsheet page for display to the user. The displayed relational spreadsheet page may then provide a two-dimensional view to the user of information associated with multi-dimensional structured database entities, for example, information associated with related objects or entities associated with a database such as a relational database.

The relational spreadsheet generator 110 may request information associated with the requested relational spreadsheet from a relational graph manager 112 included in the relational spreadsheet processor 102. A relational graph, for example, may include a graph structure indicating relational relationships among entities or objects associated with the database 106. For example, the relational graph may include nodes each associated with a database object or entity. The relational graph may further include edges connecting pairs of nodes, each edge indicating a relational relationship between the nodes connected by the edge. For example, a node A may be associated with a "school" object, a node B may be associated with a "student" object, and an edge connecting node A to node B may indicate that node A "contains" node B, for example, that the school represented by the database object associated with node A includes the student represented by the database object associated with node B. For this example, a hierarchical containment relationship may thus be indicated by the edge connecting node A to node B. As another example, the node B may be associated with a "student" object, a node C may be associated with a "teacher" object, and an edge connecting node B to node C may indicate that node B "refers to" node C, for example, that the student represented by the database object associated with node B refers to the teacher represented by the database object associated with node C, for example, by enrolling in a class taught by the teacher. For this example, a hierarchical reference relationship may thus be indicated by the edge connecting node B to node C.

If a relational graph has not yet been generated for the requested relational spreadsheet, the relational graph manager 112 may request a relational graph generator 114 to generate the relational graph, which may be stored in a relational graph storage area 116. The relational graph generator 114 may request information regarding the objects or database entities and the associated relational relationships, for example, from the database 106 via a retrieval engine 118. The retrieval engine 118 may then request the information from a database manager 120 associated with the database 106. The database manager 120 may retrieve at least a portion of the information from a database storage area 122 associated with the database 106. The database 106 may include, for example, a relational database, and thus the database manager 120 and the database storage area 122 may include a relational database manager and a relational database storage area. The relational graph generator 114 may thus request information associated with a schema indicating database entities and/or objects, and relational relationships among the database entities and/or objects. The relational graph may thus be generated based on the information indicating relational relationships among the database entities and based on information associated with the objects.

The relational spreadsheet processor 102 may include a storage engine 124 that is configured to store information in the database storage area 122 and/or in a relational spreadsheet storage area 126. For example, if a displayed relational spreadsheet page is edited by a user via the user interface 104, the relational spreadsheet manager 108 may request the relational graph manager 112 to update information in the relational graph in accordance with the user's actions. The relational graph manager 112 requests the storage engine to appropriately store the information by requesting the database manager 120 to update the database storage area 122. Further, the relational graph manager 112 may store the updated relational graph information in the relational graph storage area 116.

If the user is viewing a relational spreadsheet page and, for example, requests an expanded view of one of the displayed rows, the relational spreadsheet manager 108 may receive the request to expand, and may request the relational graph manager 112 to determine a portion of the relational graph to display by simply navigating appropriate edges connected to the relational graph node that represents the displayed row to be expanded to determine nodes that are directly connected to such a node. Once the connected nodes are determined, the relational graph manager 112 may request the retrieval engine 118 to retrieve information associated with the connected nodes from the database 106. The request may be formulated as a query for the database manager 120. The database manager 120 may retrieve the information from the database storage area 122, and may return the requested information so that the relational graph manager 112 may update the relational graph with the information. The relational graph manager 112 may then provide the information to the relational spreadsheet manager 108 for display via one or more expanded rows of cells in the spreadsheet page. Thus, according to an example embodiment, the relational graph may be navigated one node at a time so that only information associated with nodes relationally connected to a particular node may be retrieved from the database 106 when a user requests expansion of a row. Thus, according to an example embodiment, only information associated with database entities or objects that are relationally directly related to the database entity or object for which information is currently viewed by the user, may be retrieved upon request by the user via the user interface 104.

If the user is viewing a relational spreadsheet page and, for example, requests that a row be added or deleted in the relational spreadsheet page, the relational spreadsheet manager 108 may request the relational graph manager 112 to update the relational graph and request the database manager 120 to update the database 106 to reflect the requested change. Similarly, if the user requests that a column of the relational spreadsheet be added/deleted, the relational spreadsheet manager 108 may request the relational graph manager 112 to update the relational graph and request the database manager 120 to update the database 106 to reflect the requested change.

According to an example embodiment, the database storage area 122 may include storage for address strings which may, for example, include human readable address strings representing the database relationships among objects and other entities associated with the database, which may include navigation paths associated with navigating object trees for retrieving the objects based on database queries. According to an example embodiment, an indicator of the location of the stored object, such as a unique database identifier or an address, may also be stored in the database storage area 122, in association with the address strings. Such address strings may provide a mechanism for more efficient retrieval of database objects from the database 106 based on database queries.

One skilled in the art of data processing will appreciate that there may be many different types of relational spreadsheet updates/revisions that may affect the underlying relational graph and the underlying database 106. Appropriate queries or requests may be made by the relational spreadsheet manager 108 and/or the relational graph manager 112 to store/retrieve information and/or update the relational graph and/or the database 106 in accordance with user actions with regard to the currently displayed relational spreadsheet page.

Figure 2A:
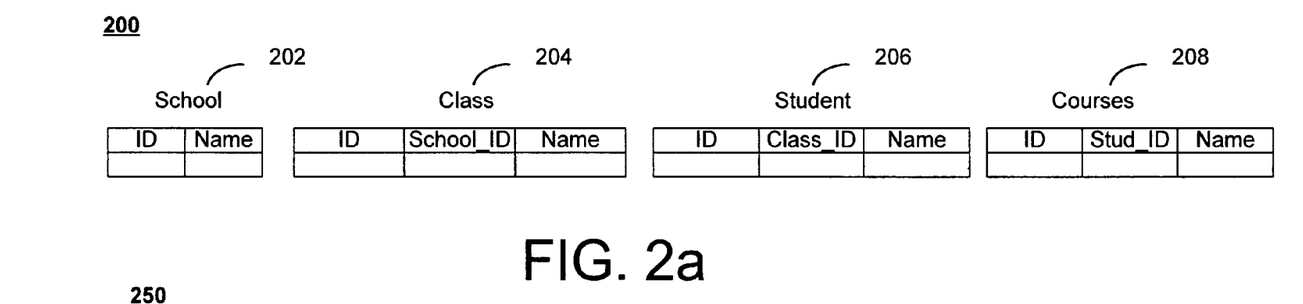
FIG. 2a is a block diagram that depicts an example schema illustrating example relationships among multiple example academic entities according to an example embodiment.

FIG. 2a is a block diagram that depicts an example schema illustrating example relationships among multiple example academic entities according to an example embodiment. In the example of FIG. 2a, a school 202 is shown as including a name and ID, for example, a school may include a name "Biggs." A class 204 is shown as including an ID for a particular class object, a school_ID for a related school, and a name field for the name of the particular class object, for example, a class named "Junior." A student 206 may include an ID for a particular student, a class_ID for a related class object, and a name for the particular student. For example, a student named "Sally Jones" may include a class_ID value for the "Junior" class discussed previously. A course 208 may include an ID for a particular course, a stud_ID for a related student, and a name of the particular course. For example, a course object named "CS 206" may include a stud_ID value associated with the student "Sally Jones" discussed previously. Thus, a group of course objects all having the same value in the courses 208 stud_ID field may represent the courses for which the student represented by the stud_ID field is enrolled. Similarly, a group of student objects all having the same value in the student 206 class_ID field may represent the students of a particular class, for example, the students of a "Freshman" class of a particular school.

Information indicated by the schema 200 may be used, for example, by the relational graph generator 114 in generating the relational graph discussed previously. Thus, a schema may represent, for example, a set of two-dimensional relationships. According to the schema 200, for example, a node associated with the school 202 may be directly connected via a relational edge to a node associated with the class 204, which may be directly connected via a relational edge to a node associated with the student 206. The node associated with the student 206 may be directly connected via a relational edge to a node associated with the courses 208.

Figure 2B:
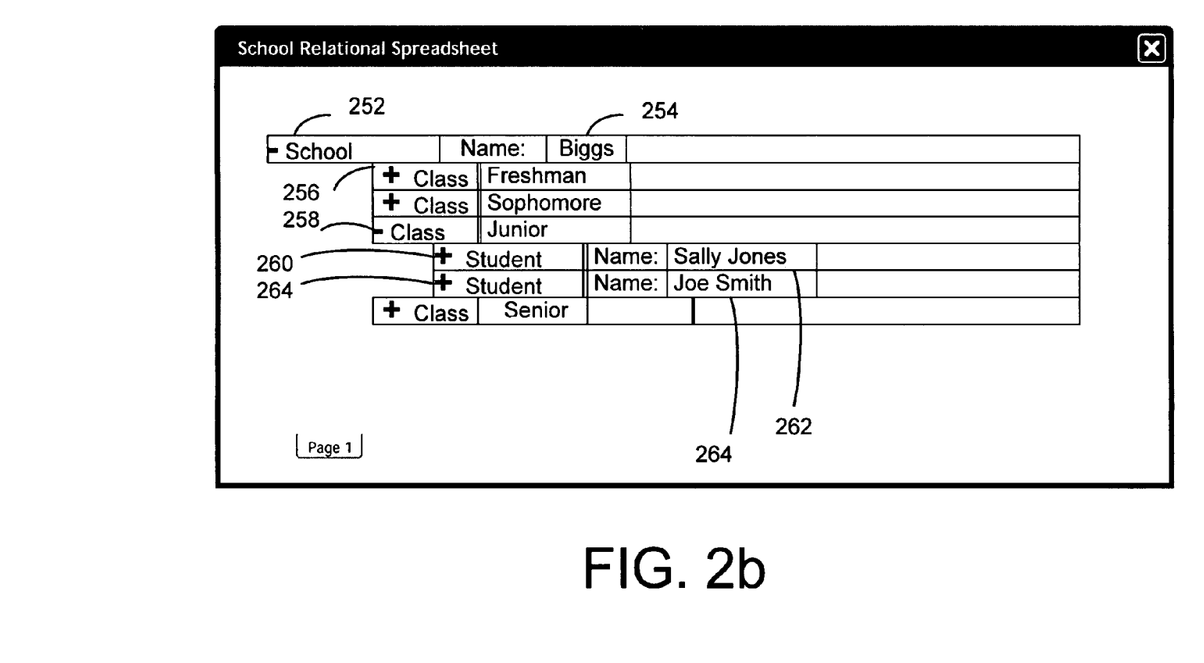
FIG. 2b is a block diagram that depicts an example relational spreadsheet page format according to an example embodiment.

FIG. 2b is a block diagram that depicts an example relational spreadsheet page format 250 associated with the schema 200, according to an example embodiment. A cell 252 displays a "−" symbol to indicate that the row containing the cell is expanded. For example, the row containing the cell 252 associated with the school 202 having a name 254 "Biggs" is expanded. A cell 256 displays a "+" symbol to indicate that the row containing the cell is collapsed. As shown in FIG. 2b, rows displayed with "indented" cell values indicated that the cells represent the rows that are displayed as a result of an expansion operation for a previous row. As shown, row 252 represents a node at the root level, for example, a start node of a navigation path, of a relational graph which is connected to other nodes via an edge in the relational graph that indicates a relationship from the root node to another node. Thus, the cells of FIG. 2b that indicate a value of "class" indicate corresponding rows including information associated with class objects that are directly related to the school named "Biggs."

As shown in FIG. 2b, a row 258 including information associated with a class 204 object named "Junior" is expanded to display a collapsed row 260 associated with a student 206 object named "Sally Jones" and a collapsed row 264 associated with a student 206 object named "Joe Smith." As discussed previously, a user may, for example, request expansions and/or collapsing of displayed rows. For example, by selecting, or by clicking on the "−" symbol of the cell 252, the user may collapse the corresponding row, and the relational spreadsheet manager 108 may then display only the row of cells containing the values associated with the school 202 named "Biggs." Further, the user may decide to edit the information in displayed cells.

As shown, each row includes cells displaying one or more values, and a user of the relational spreadsheet page 250, for example, via the user interface 104, may edit the values such that the underlying relational graph may be updated in accordance with the changes made by the user, and the underlying database may also be updated in accordance with the changes. The changes may include updating or editing values shown in individual cells, and may also include adding rows and/or columns to the spreadsheet page. For example, the user may edit the name "Sally Jones" to "Sally Smith" for example if Sally marries Joe, and the relational spreadsheet manager 108 may request corresponding updates to be made to the underlying relational graph and the database 106.

Figure 3:
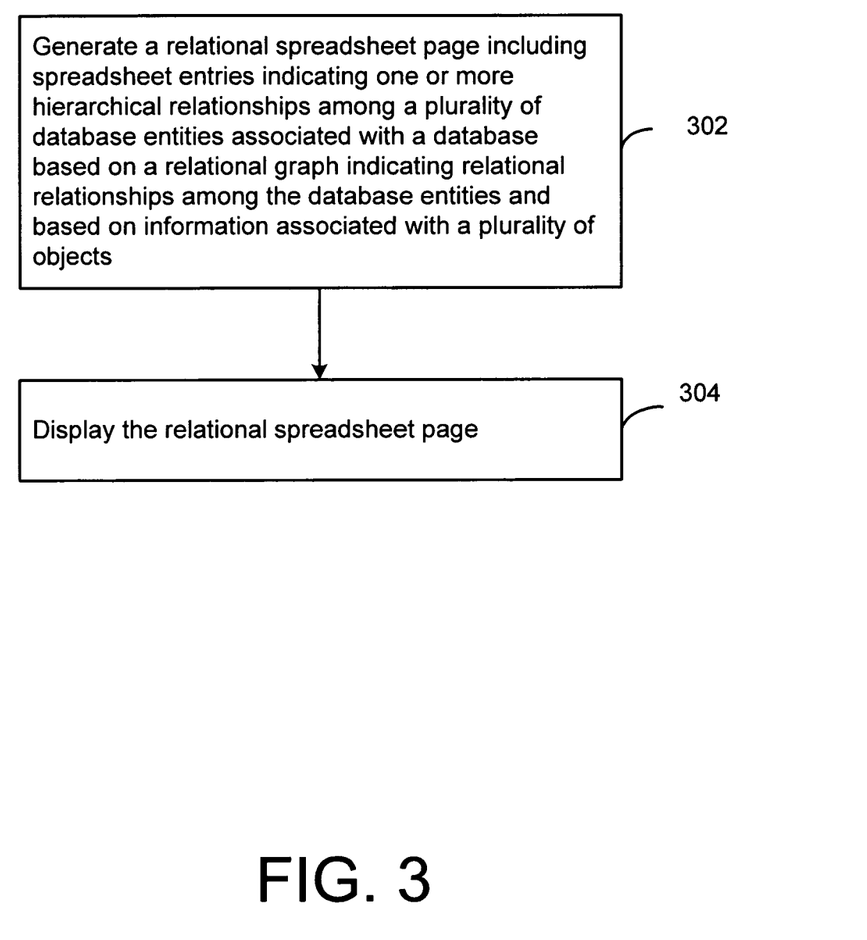
FIG. 3 is a flowchart illustrating an operation of the system of FIG. 1.

FIG. 3 is a flowchart illustrating an example operation of the system of FIG. 1. At 302, a relational spreadsheet page may be generated including relational spreadsheet entries indicating one or more hierarchical relationships among a plurality of database entities associated with a database based on a relational graph indicating relational relationships among the database entities and based on information associated with a plurality of objects. For example, the relational spreadsheet page may be generated by the relational spreadsheet manager 108 as discussed previously. For example, the relational spreadsheet page may include the format 250 discussed previously with regard to FIGS. 2a-2b, and the plurality of objects may include database objects associated with schools 202, classes 204, students 206, and courses 208 as discussed previously.

At 304, the relational spreadsheet page may be displayed. For example, the relational spreadsheet page may be displayed by the relational spreadsheet manager 108 and may include the format 250 discussed previously with regard to FIGS. 2a-2b. Further example relational graphs and relational spreadsheet pages are discussed below.

Figure 4:
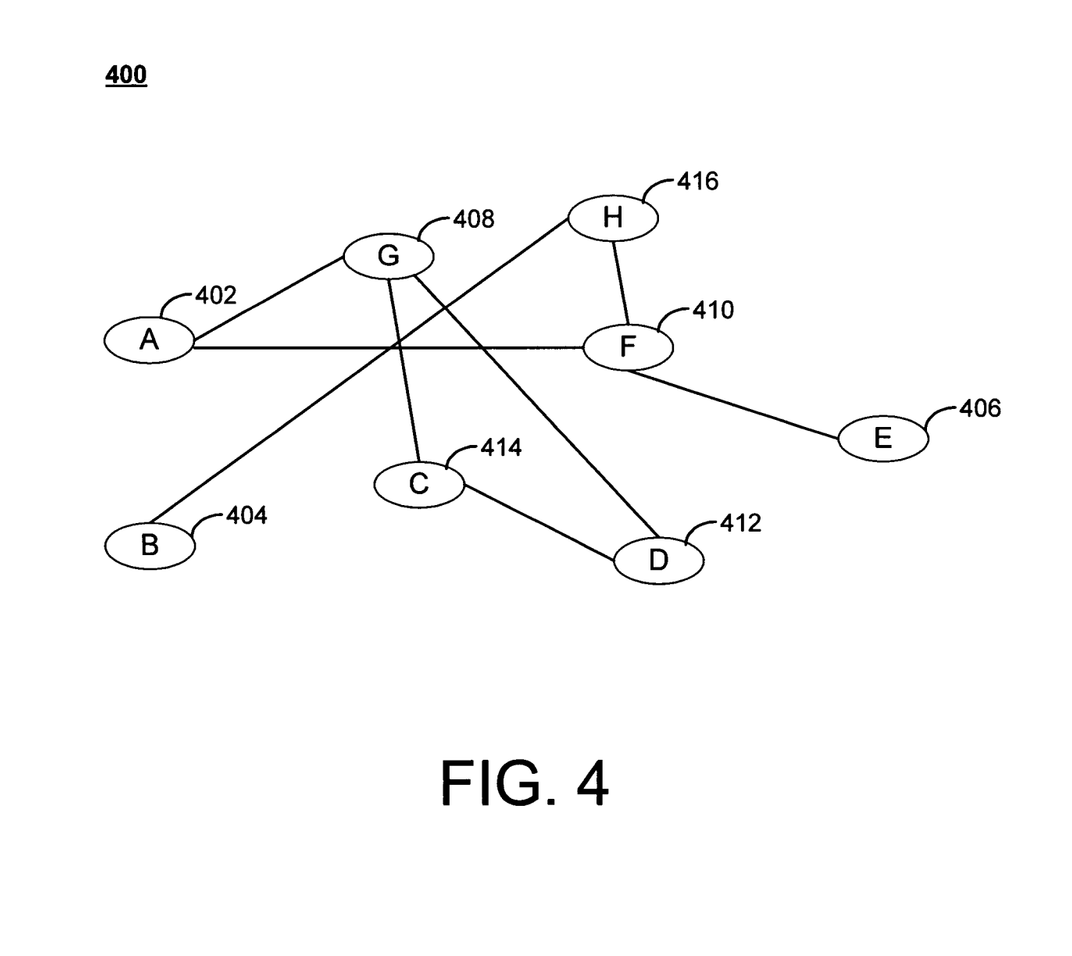
FIG. 4 is a block diagram that depicts an example relational graph according to an example embodiment.

FIG. 4 is a block diagram that depicts an example relational graph according to an example embodiment. As shown in FIG. 4, a node A 402 may include a same object or entity type as node B 404 and node E 406. Similarly, a node G 408 may include a same object or entity type as node F 410 and node D 412. Further, node C 414 may include a same object or entity type as node H 416.

As shown in FIG. 4, node A 402 is connected to node G 408 via an edge. Node G 408 is further connected to node C 414 via an edge, and Node C 414 is connected to each of node D 412 and node G 408, respectively, via edges. Thus, a navigation path included in the of the relational graph 400 may start at node A 402, follow the edge from node A 402 to node G 408, the edge from node G 408 to node C 414, and the edge from node C 414 to node G 408. For example, database objects corresponding to the nodes may include a school, students of the school, courses of the student, and students enrolled in the course, thus providing a circularity of navigation paths, or a loop. Node B 404 is connected to node H 416 via an edge, node E 406 is connected to node F 410 via an edge, and node F 410 is connected to each of node H 416 and node A 402, respectively, via an edge.

According to an example embodiment, the relational graph 400 may be generated by the relational graph generator 114 based on information regarding database entities and/or objects included in the database 106, as discussed previously. The relational graph manager 112 may then respond to requests for information by navigating paths within the relational graph 400, requesting more information from the database 106 when needed, and storing updated information in the database 106 when needed. Further, information associated with the relational graph 400 may be stored in the relational graph storage area 116.

Figure 5:
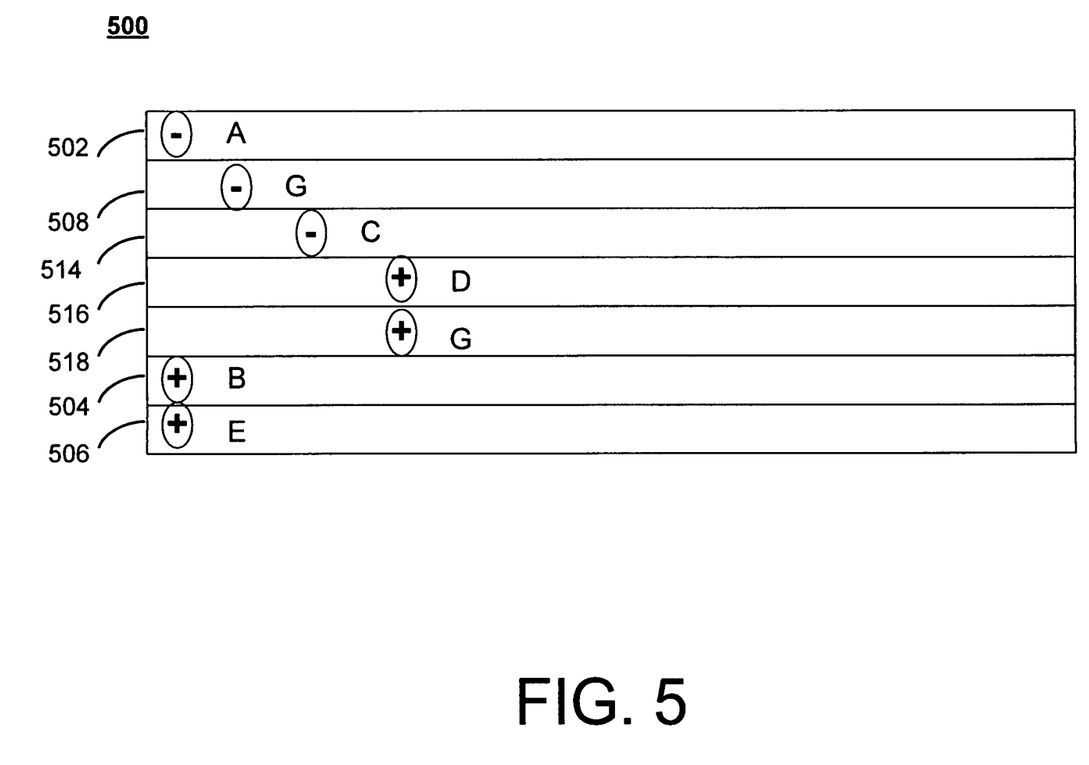
FIG. 5 is a block diagram that depicts an example relational spreadsheet page format associated with the relational graph of FIG. 4 according to an example embodiment.

FIG. 5 is a block diagram that depicts an example relational spreadsheet page format 500 associated with the relational graph of FIG. 4 according to an example embodiment. As shown, example rows 502, 504, and 506 may represent corresponding node A 402, node B 404, and node E 406. Further, an example row 508 may represent corresponding node G 408, and an example row 514 may represent corresponding node C 414. Example rows 516 and 518 may represent corresponding node D 412 and node G 508. According to an example embodiment, the relational spreadsheet manager 108 may provide a relational spreadsheet page according to the relational spreadsheet page format 500 based on the relational graph 400 in cooperation with the relational graph manager 112, as discussed previously. Information associated with the relational spreadsheet page may be stored in the relational spreadsheet storage area 126 for later retrieval when needed.

For applications that use relational data, the example relational spreadsheet techniques discussed herein may advantageously improve user interaction with a database generally. For example, a user of the relational spreadsheet may view information associated with database objects via a two-dimensional spreadsheet page, and may decide or not to view particular expanded two-dimensional views to navigate a relational object tree via the relational spreadsheet page.

FIG. 6 is a block diagram that depicts an example relational spreadsheet page 600 according to an example embodiment. Each row of the page represents information associated with a database entity or object. The database entity or object is represented by a first node in a relational graph, for example, the relational graph 400 of FIG. 4. If the row is expanded, then the next row represents information associated with a database entity or object related to the object associated with the row that is expanded. For example, the next displayed row represents information associated with a database entity or object represented by a node that is connected to the first node by an edge in the relational graph.

A set of columns 601 of the spreadsheet page 600 includes cells displaying a "−" symbol to indicate that the row containing the cell is expanded. For example, row 602 is expanded. The set of columns 601 also includes cells displaying a "+" symbol to indicate that the row containing the cell is collapsed. For example, row 604 is collapsed. As shown, rows 602, 604, 606, 608, and 610 all represent nodes at the root level, for example, start nodes of a navigation path, of a relational graph which are connected to other nodes via an edge in the relational graph that indicates a relationship from the root node to another node. Rows that have neither a "−" nor a "+" symbol in the set of columns 601 are not configured to be collapsed or expanded, and thus a node in the relational graph representing such rows does not include an edge indicating a relationship from such a node to other nodes in the relational graph. Thus, the database entities or objects represented by such nodes do not include a relationship from the database entities or objects to database entities or objects. One skilled in the art of data processing will appreciate that other techniques and/or other arrangements of a display may also be used for receiving such requests from a user to display rows representing information associated with nodes of the relational graph that are directly connected to a node represented by a currently displayed row in a spreadsheet.

As shown in FIG. 6, each row may include cells displaying one or more values, and a user of the spreadsheet page 600 may edit the values such that the underlying relational graph may be updated in accordance with the changes made by the user, and the underlying database may also be updated in accordance with the changes. The changes may include updating or editing values shown in individual cells, and may also include adding rows and/or columns to the spreadsheet page.

Row 612 of the relational spreadsheet page 600 may represent the first node in the expansion of row 602. Thus row 612 may represent a node in the relational graph that may be connected to the node represented by row 602 via an edge from the node associated with row 602 to the node associated with row 612. Thus, information displayed in the data cells of row 612 may be associated with a database entity or object in the underlying database, for example, the database 106 that is associated with the corresponding node on the relational graph. As shown, rows 612, 614, 616, 618, and 620 may be displayed as a result of expanding row 602. The nodes in the underlying relational graph that are associated with rows 612, 614, 616, 618, and 620 may thus be connected to the node represented by row 602 via edges from the node associated with row 602 to each of the nodes associated with rows 612, 614, 616, 618, and 620. For example, a user may request an expansion via the user interface 104, and the relational spreadsheet manager 108 may request the relational graph manager 116 to provide the information for the expanded cells based on navigating, and potentially updating, the relational graph.

As shown in FIG. 6, example row 624 may represent a node in a third-level expansion of nodes, and thus may represent a node in the underlying relational graph that is connected to the node represented by row 602 via a path including four nodes and three edges in a hierarchical navigation from the node represented by row 602 to the node represented by row 624. For example, the row 516 of FIG. 5 may represent the node D 412 of FIG. 4 which may be reached by starting a navigation path of the relational graph 400 at node A 402, following the edge from node A 402 to node G 408, the edge from node G 408 to node C 414, and the edge from node C 414 to node D 412.

As further shown in FIG. 6, example row 626 may represent another node in the third-level expansion of nodes, and may also represent a node in the underlying relational graph that is connected to the node represented by row 602 via a path including four nodes and three edges in a hierarchical navigation from the node represented by row 602 to the node represented by row 626. For example, the row 518 of FIG. 5 may represent the node G 408 of FIG. 4 which may be reached by starting a navigation path of the relational graph 400 at node A 402, following the edge from node A 402 to node G 408, the edge from node G 408 to node C 414, and the edge from node C 414 to node G 408. For example, database objects corresponding to the nodes, and thus to the rows, may include a school, students of the school, courses of the student, and students enrolled in the course, thus providing a circularity of navigation paths. For example, the relational graph manager 112 may navigate the relational graph 400.

As shown in FIG. 6, example row 630 does not include either of the collapsible symbol or the expandable symbol, and thus is not configured to be expanded or collapsed. The cells shown in row 630 displaying data values may be edited/updated, and the modifications may be received and stored in corresponding nodes in the underlying relational graph, and thus, the underlying database, for example, the database 106 may be updated based on the edits/updates performed in the relational spreadsheet cells.

By using example techniques as discussed previously, a user may improve his/her experiences with spreadsheets and with databases. For example, a database administrator may use a relational spreadsheet to make mass changes on the data included in a relational database. As another example, a user may conveniently navigate an entire object and database schema by simply requesting and viewing one page of the relational spreadsheet, and may conveniently edit/update values from the single page, which may, for example, be viewed via a web browser. For example, if a user adds a new student name and new student information in one view of the relational spreadsheet, then the student name may also be added in other records that also include a name field, in accordance with relationships included in the relational database.

The example techniques discussed herein may provide example means for programmatically reading existing data stores and relationships into a "graph" data structure that may, for example, be stored in dynamic memory for faster access. The graph data structure may then, for example, be rendered onto a single web page such that each cell of information is editable and persistable. As an example navigational tool, by starting with an initial table of objects on the page (i.e., each object to be displayed has been loaded into the graph data structure as a node), then from each object one can navigate all objects related to that object by, for example, using user selection actions such as mouse clicks or other user selection actions, as a navigation technique. Each displayed row corresponding, for example, to a database object, may be rendered as a list of editable cells. Using these techniques, a user may be able to display and edit an object graph of arbitrary complexity.

Thus, an example relational spreadsheet may provide a means to capture child objects and rows in a spreadsheet page at an arbitrary level of depth. Therefore, hierarchical data may be advantageously displayed on a single spreadsheet page as opposed to conventional techniques that may include using multiple spreadsheets. Further, example relational spreadsheet techniques may provide a means to create and edit such a spreadsheet online in a web browser, by including standard functionalities such as add/deleteRow, add/deleteColumn at any depth.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:
   generating, by at least one processor, a relational graph for a requested relational spreadsheet based on database objects stored in a relational database, the relational graph including a graph structure indicating relational relationships among the database objects stored in the relational database, the graph structure having a plurality of nodes and edges connecting at least two nodes of the plurality of nodes, each node being associated with a database object within the relational database, and each edge representing a hierarchical relationship between the at least two nodes;

storing, by the at least one processor, the relational graph in a relational graph storage database;

displaying, by the at least one processor, a single relational spreadsheet page providing a plurality of spreadsheet entries arranged in at least one of columns and rows according to a relational spreadsheet page format based on the relational graph; receiving, by the at least one processor, a request to expand a column or row in the single relational spreadsheet page based on an interaction with an indicator associated with the column or row;

determining, by the at least one processor, a portion of the relational graph including navigating edges connected to a node that represents the column or row to be expanded and determining nodes connected to the node of the column or row to be expanded on a node-by-node basis based on the navigated edges such that nodes having relational relationships with the column or row to be expanded are identified;

querying, by the at least one processor, the relational database for the identified nodes, and retrieving information associated with the identified nodes from the database objects stored in the relational database that correspond to the identified nodes in response to the query such that database objects without relational relationships to the column or row to be expanded are not retrieved from the relational database; and displaying, by the at least one processor, the retrieved information via the expanded column or row in the single relational spreadsheet page.

2. The method of claim 1, wherein each database object includes an object identifier that identifies a respective database object, wherein at least some of the database objects further includes a secondary object identifier that identifies a related database object, wherein the relational graph is generated based on the object identified and the secondary object identifier.

3. The method of claim 1 further comprising:
receiving, by the at least one processor, a request to modify the single relational spreadsheet page;
updating, by the at least one processor, the relational graph and the relational database based on the request.

4. The method of claim 1 further comprising:
receiving, by the at least one processor, relationship information representing a database schema indicating the hierarchical relationships among the database objects; and
generating, by the at least one processor, the relational graph based on the relationship information.

5. The method of claim 1, wherein displaying, by the at least one processor, a relational spreadsheet page includes:
displaying the indicator showing whether a respective column or row is expanded such that all spreadsheet entries, if any, associated in a direct subordinate hierarchal relationship with the column or row are currently displayed, or is collapsed such that not all spreadsheet entries associated in the direct subordinate hierarchal relationship with the respective column or row are currently displayed.

6. The method of claim 1, wherein the spreadsheet entries arranged in the columns or rows display one or more values, wherein the method further includes:
changing, by the at least one processor, the one or more values such that the relational graph and the relational database are dynamically updated with the one or more changed values.

7. A relational spreadsheet apparatus comprising:
at least one processor;
a non-transitory computer-readable storage medium including instructions executable by the at least one processor, the instructions configured to implement,
a relational graph generator configured to generate a relational graph for a requested relational spreadsheet based on database objects stored in a relational database, the relational graph including a graph structure indicating relational relationships among the database objects stored in the relational database, the graph structure having a plurality of nodes and edges connecting at least two nodes of the plurality of nodes, each node being associated with a database object, and each edge representing a hierarchical relationship between the at least two nodes,
the relational graph generator configured to store the relational graph in a relational graph storage database;
a relational spreadsheet manager configured to display a single relational spreadsheet page providing a plurality of spreadsheet entries arranged in at least one of columns and rows according to a relational spreadsheet page format based on the relational graph, and configured to receive a request to expand a column or row in the single relational spreadsheet page based on an interaction with an indicator associated with the column or row;
a relational graph manager configured to determine a portion of the relational graph including navigating edges connected to a node that represents the column or row to be expanded and determining nodes connected to the node of the column or row to be expanded on a node-by-node basis based on the navigated edges such that nodes having relational relationships with the column or row to be expanded are identified; and
a retrieval engine configured to query the relational database for the identified nodes, and retrieve information associated with the identified nodes from the database objects stored in the relational database that correspond to the identified nodes in response to the query, such that database objects without relational relationships to the column or row to be expanded are not retrieved from the relational database,
wherein the relational spreadsheet manager is configured to display the retrieved information via the expanded column or row in the single relational spreadsheet page.

8. The relational spreadsheet apparatus of claim 7, wherein each database object includes an object identifier that identifies a respective database object, wherein at least some of the database objects further includes a secondary object identifier that identifies a related database object, wherein the relational graph generator is configured to generate the relational graph based on the object identifier and the secondary object identifier.

9. The relational spreadsheet apparatus of claim 7,
wherein the relational spreadsheet manager is configured to receive a request to modify the single relational spreadsheet page,
wherein the relational graph manager is configured to update the relational graph and the relational database based on the request.

10. The relational spreadsheet apparatus of claim 7,
wherein the relational graph generator is configured to receive relationship information representing a database schema indicating the hierarchical relationships among the database objects, and generate the relational graph based on the relationship information.

11. The relational spreadsheet apparatus of claim 7,
wherein the relational spreadsheet manager is configured to display the indicator showing whether a respective column or row is expanded such that all spreadsheet entries, if any, associated in a direct subordinate hierarchal relationship with the column or row are currently displayed, or is collapsed such that not all spreadsheet entries associated in the direct subordinate hierarchal relationship with the respective column or row are currently displayed.

12. The relational spreadsheet apparatus of claim 7, wherein the spreadsheet entries arranged in the columns or rows display one or more values, wherein the relational spreadsheet manager is configured to change the one or more values such that the relational graph and the relational database are dynamically updated with the one or more changed values.

13. A non-transitory computer-readable medium storing instructions that when executed cause at least one processor to implement a relational spreadsheet processor, the instructions comprising instructions to:
generate a relational graph for a requested relational spreadsheet based on database objects stored in a relational database, the relational graph including a graph structure indicating relational relationships among the database objects stored in the relational database, the graph structure having a plurality of nodes and edges connecting at least two nodes of the plurality of nodes, each node being associated with a database object, and each edge representing a hierarchical relationship between the at least two nodes;
store the relational graph in a relational graph storage database; display a single relational spreadsheet page providing a plurality of spreadsheet entries arranged in at least one of columns and rows according to a relational spreadsheet page format based on the relational graph;
receive a request to expand a column or row in the single relational spreadsheet page based on an interaction with an indicator associated with the column or row;
determine a portion of the relational graph including navigating edges connected to a node that represents the column or row to be expanded and determining nodes connected to the node of the column or row to be expanded on a node-by-node basis based on the navigated edges such that nodes having relational relationships with the column or row to be expanded are identified;
query the relational database for the identified nodes, and retrieve information associated with the identified nodes from the database objects stored in the relational database that correspond to the identified nodes in response to the query such that database objects without relational relationships to the column or row to be expanded are not retrieved from the relational database; and
display the retrieved information via the expanded column or row in the single relational spreadsheet page.

14. The non-transitory computer-readable medium of claim 13, wherein each database object includes an object identifier that identifies a respective database object, wherein at least some of the database objects further includes a secondary object identifier that identifies a related database object.

15. The non-transitory computer-readable medium of claim 14, wherein the instructions to generate a relational graph based on database objects stored in a relational database includes instructions to generate the relational graph based on the object identifier and the secondary object identifier.

16. The non-transitory computer-readable medium of claim 13, further comprising instructions to:
receive a request to modify the single relational spreadsheet page;
update the relational graph and the relational database based on the request.

17. The non-transitory computer-readable medium of claim 13, further comprising instructions to:
receive relationship information representing a database schema indicating the hierarchical relationships among the database objects; and
generate the relational graph based on the relationship information.

18. The non-transitory computer-readable medium of claim 13, wherein the instructions to display a relational spreadsheet page include instructions to:
display the indicator showing whether a respective column or row is expanded such that all spreadsheet entries, if any, associated in a direct subordinate hierarchal relationship with the column or row are currently displayed, or is collapsed such that not all spreadsheet entries associated in the direct subordinate hierarchal relationship with the respective column or row are currently displayed.

19. The non-transitory computer-readable medium of claim 13, wherein the spreadsheet entries arranged in the columns or rows display one or more values, wherein the instructions include instructions to:
change the one or more values such that the relational graph and the relational database are dynamically updated with the one or more changed values.

20. The method of claim 1, wherein the relational spreadsheet page format arranges the plurality of nodes in a manner indicated by the relational relationships of the relational graph.

21. The method of claim 1, wherein the relational database stores address strings representing the relational relationships among the database objects stored in the relational database, the address strings including navigation paths for retrieving the database objects based on the query, the relational database further storing unique database identifiers in association with the address strings, the unique database identifiers indicating locations of the database objects.

* * * * *